US010295652B2

(12) United States Patent
Menge

(10) Patent No.: US 10,295,652 B2
(45) Date of Patent: May 21, 2019

(54) VEHICLE RADAR SYSTEM FOR DETECTING THE SURROUNDINGS

(71) Applicant: Conti Temic microelectronic GmbH, Nuremberg (DE)

(72) Inventor: Michael Menge, Munich (DE)

(73) Assignee: Conti Temic microelectronic GmbH, Nuremberg (DE)

( * ) Notice: Subject to any disclaimer, the term of this patent is extended or adjusted under 35 U.S.C. 154(b) by 247 days.

(21) Appl. No.: 15/111,052

(22) PCT Filed: Jan. 28, 2015

(86) PCT No.: PCT/DE2015/200037
§ 371 (c)(1),
(2) Date: Jul. 12, 2016

(87) PCT Pub. No.: WO2015/113566
PCT Pub. Date: Aug. 6, 2015

(65) Prior Publication Data
US 2017/0003377 A1    Jan. 5, 2017

(30) Foreign Application Priority Data
Jan. 31, 2014 (DE) .................. 10 2014 201 728

(51) Int. Cl.
*G01S 7/02* (2006.01)
*G01S 7/03* (2006.01)
(Continued)

(52) U.S. Cl.
CPC ............ *G01S 7/032* (2013.01); *G01S 13/931* (2013.01); *H01P 3/121* (2013.01); *G01S 2007/028* (2013.01)

(58) Field of Classification Search
CPC .. G01S 7/032; G01S 13/931; G01S 2007/028; H01P 3/121
(Continued)

(56) References Cited

U.S. PATENT DOCUMENTS 5,818,381 A * 10/1998 Williams ............... A61H 3/061
342/24
2009/0066597 A1    3/2009 Yang et al.
(Continued)

FOREIGN PATENT DOCUMENTS

DE    102004018854    11/2005
EP    2 224 535        9/2010

OTHER PUBLICATIONS

International Search Report of the International Searching Authority for International Application PCT/DE2015/200037, dated May 15, 2015, 2 pages, European Patent Office, HV Rijswijk, Netherlands.
(Continued)

Primary Examiner — Frank J McGue
(74) Attorney, Agent, or Firm — W. F. Fasse

(57) ABSTRACT

A vehicle radar system (2) for detecting the surroundings, includes a circuit board (4), with a substrate layer (14) having an upper face (14a) and a lower face (14b), a strip conductor (22) applied onto the upper face (14a) so as to surround a shielding region (20), a shielding housing (6) that covers the shielding region (20) and that extends along and is connected to the strip conductor (22) in an electrically conductive manner, and at least one wave guide (28) arranged in the substrate layer. The wave guide (28) has a laterally delimiting wave guide wall (28c) as well as upper and lower wave guide surfaces (28a, 28b), wherein the upper wave guide surface (28a) is a section of the strip conductor (22).

19 Claims, 2 Drawing Sheets

(51) Int. Cl.
*H01P 3/12* (2006.01)
*G01S 13/93* (2006.01)
(58) Field of Classification Search
USPC .......................................................... 342/175
See application file for complete search history.

(56) References Cited

U.S. PATENT DOCUMENTS

2010/0245155 A1\* 9/2010 Miyazato ................ G01S 7/032
342/104
2012/0013499 A1\* 1/2012 Hayata .................... G01S 7/032
342/112

OTHER PUBLICATIONS

PCT International Preliminary Report on Patentability including English Translation of PCT Written Opinion of the International Searching Authority for International Application PCT/DE2015/200037, dated Aug. 2, 2016, 9 pages, International Bureau of WIPO, Geneva, Switzerland.
German Search Report for German Patent Application No. 10 2014 201 728.9, dated Oct. 17, 2014, 7 pages, Muenchen, Germany, with partial English translation, 5 pages.

\* cited by examiner

VEHICLE RADAR SYSTEM FOR DETECTING THE SURROUNDINGS

FIELD OF THE INVENTION

The invention relates to a vehicle radar system for detecting the surroundings.

BACKGROUND INFORMATION

Radar systems are found for example in both guided and autonomous vehicles, building machinery or manufacturing plants. In particular in a vehicle guided by a driver, radar systems establish values of specific environment parameters, for example a distance from said vehicle to another object, whereby, for example, the decision made by the driver can be supported or said driver can be notified of safety risks. In particular, radar systems for measuring intervals are becoming more frequently used, for example as a parking aid or as collision warning systems in vehicles. Such radar systems which have HF electronics with corresponding HF components, for example HF transmitters and receivers as well as suitable antennae, are operated in particular in the high-frequency range (HF range). Frequently, there are also further radar systems as well as in particular further electronic systems, the functionality of which is impaired by interfering signals emitted by the HF components. In order, additionally, to guarantee a functionality of possible other systems and comply with corresponding EMC standards it is therefore necessary to shield such components in particular from other systems which emit an interfering signal.

For this it is possible to provide a number of circuit boards having HF components with a shielding housing in such a way that said HF components are arranged in a space defined by said shielding housing and the side of the circuit board facing the shielding housing, also called circuit board upper face. In particular, this helps define a shielding region on said circuit board. Said shielding housing is typically made from an electrically conductive material. Additionally, on the side of said circuit board facing away from the shielding housing, also called circuit board lower face, there is frequently formed a shielding in such a way that said HF components are surrounded, substantially completely, by an electrically conductive material.

However, in the case, for example, of a radar system, it is necessary to provide an HF signal as a useful signal for an antenna outside of said shielding region. However, an additional opening in said shielding housing drastically degrades its shielding properties. To prevent such a degradation, said useful signal can be routed beneath said shielding housing by means of a so-called strip transmission line. The disadvantage here is that, in order to design said strip transmission line, a conductor must be developed inside the circuit board substrate, as a result of which in actual fact a multilayer system is present, i.e. two substrate layers arranged one on top of the other are required, with a line arranged between these layers. Additionally, microstrips are frequently used within said shielding housing which are simpler to produce and are more space-saving than strip transmission lines, as a result of this a junction from microstrip to strip transmission line is required. However, such a junction creates disadvantageous reflection losses, i.e. a reduction of said signal.

Alternatively, said useful signal can also be guided from the uppermost layer which has said HF components via throughplatings onto a second substrate layer arranged beneath said circuit board upper face and routed beneath said shielding housing by means of a microstrip. In other words, said useful signal can be routed beneath said shielding housing by means of a microstrip developed on a lower substrate layer. However, a junction between the different substrate layers is needed to do this. Also, such a junction is disadvantageously lossy. Furthermore, it is disadvantageous that both alternatives are correspondingly costly due to the multilayer system required. Because an HF substrate which is typically more costly in comparison with conventional circuit board substrates is used to develop layers which conduct HF signals, both alternatives are also correspondingly cost-intensive.

SUMMARY OF THE INVENTION

An object of the invention is to indicate a circuit board comprising a radar system in which, if there is a good shielding efficiency, useful signals can be conducted out of a shielding region more simply.

According to a first aspect of the invention, a radar system, in particular for detecting the surroundings of a vehicle, has a circuit board with a substrate layer comprising an upper face and a lower face. Typically there are arranged on said upper face of said substrate layer a number of circuit components, in particular HF components, to produce an electronic circuit. By HF, i.e. high-frequency, is meant here in particular a frequency range of a few gigahertz up to a few hundred gigahertz. Furthermore, a strip conductor surrounding a shielding region is applied onto said upper face, along which a shielding housing that covers said shielding region is connected to this strip conductor in an electrically conductive manner. Additionally, there is at least one wave guide (i.e. waveguide) arranged in said substrate layer, which wave guide has a laterally delimiting wave guide wall as well as an upper and a lower wave guide surface, wherein said upper wave guide surface of said wave guide is a section of said strip conductor. In other words: a part of said strip conductor is, at the same time, a delimitation of said wave guide. This makes possible a conduction, out of said shielding region, of a useful signal provided within said shielding region. By this is meant in particular that a first HF component is arranged inside said shielding region and a second HF component is arranged outside said shielding region, and both are suitably connected to transmit said useful signal. For example, here, said first HF component is an oscillator, i.e. a generator of an HF signal, and said second HF component is an antenna. In particular, a shielding housing without any opening for conduction of said useful signal can also be produced as a result, whereby an emission of signals out of a space defined by said shielding region and said shielding housing is reduced or completely prevented. Additionally, a penetration of interfering signals into this space is likewise reduced or prevented.

In addition to said substrate layer, said circuit board advantageously has further substrate layers. This makes possible in particular the accommodation of further circuit components. In particular, said substrate layers are made from different materials. Preferably, said substrate layers are arranged in a stack. In particular, this results in an easily producible build-up of layers of said circuit board. In particular, said wave guide is arranged in said uppermost substrate layer, preferably any wave guides are arranged exclusively in said uppermost substrate layer. This results in particular in a more compact and cost-effective configuration.

The in particular closed strip conductor surrounds said shielding region in particular completely on the upper face.

Furthermore, said shielding housing is connected to said strip conductor in electrically conductive manner, and in particular completely surrounding same, whereby in particular both have a uniform electric potential. To produce an electrically conductive connection, said shielding housing is for example soldered to said strip conductor or stuck to same by means of a suitable adhesive. Furthermore, said shielding housing is advantageously produced as a deep drawn part, whereby in particular the production costs are low.

Furthermore, said wave guide is arranged in particular in said substrate layer and delimited by said side wave guide walls as well as said upper and lower wave guide surfaces. By wave guide is meant in particular a number of surfaces and/or walls and an interior delimited by same. In particular, said wave guide is designed to transmit an electromagnetic signal, in particular from said first HF component to said second HF component. Said signal is typically a high-frequency useful signal, in particular with a frequency of several tens of gigahertz, for example in the range of from 70-80 Ghz. Said wave guide has in particular two ends, each of which is connected to said first and respectively said second HF component directly or by means of one or more further lines. In a preferred embodiment, at least one of said further lines is designed as a microstrip. The result of this is in particular a more compact circuit layout in comparison with a circuit which is based exclusively on wave guides. To connect a microstrip and a wave guide, expediently a suitable junction is provided to guarantee a transmission of said useful signal which is as efficient as possible.

In an advantageous embodiment, said wave guide is designed or configured to be as long as possible, in particular said wave guide has a length and a width and said length is greater than said width. Because the barrier effect increases as said length of said wave guide also increases, that barrier effect is in particular improved as a result of this. For example, said wave guide is several tens of millimeters long and a few millimeters wide, i.e. in particular it is longer than it is wide. Additionally, said wave guide is in particular designed or configured S-shaped.

In a preferred embodiment, said wave guide wall is formed by a conductive material. Said conductive material is for example copper. In particular a loss by emission from said wave guide through said wave guide walls is reduced by this.

Appropriately, said conductive material is arranged such that this connects said upper wave guide surface and said lower wave guide surface in electrically conductive manner by a type of throughplating. In particular said loss by emission is additionally reduced via said wave guide walls. By throughplating is generally meant here a conductive connection of two non-identical planes which are substantially parallel to said circuit board upper face (and thus typically also to said circuit board lower face). Furthermore, as a result of this, said upper and said lower wave guide surface as well as said wave guide walls are connected to a uniform electric potential, whereby in particular the transmission of said signal through said wave guide is improved.

In a further preferred embodiment, a number of recesses is introduced into said substrate layer to develop said wave guide wall. As a result of this, in particular a simple introduction of said conductive material between upper and lower face of said substrate layer is made possible. For example, said recesses are grooves introduced into said substrate layer by milling or etching, and each of which grooves extends along said wave guide. In a preferred embodiment, said recesses are in particular round holes (so-called vias), on the respective inner wall of which said conductive material is at least partially, but preferably completely, attached. For example, said conductive material is inserted or pressed into each of said recesses in the form of a sleeve or a pin. Alternatively, said conductive material is attached to said inner wall by means of a deposition method.

In an advantageous embodiment, said recesses are arranged along said wave guide at an average interval of at least 0.5 mm and at most 4 mm. As a result of this, in particular the most interference-free possible transmission of a signal having a frequency selected which is suitable for radar applications is guaranteed.

In a preferred embodiment, said recesses are cylindrical holes which are arranged substantially equidistant from one another along said wave guide walls and in said substrate layer, for example at an interval of a few millimeters. As a result of this, in particular a production of said wave guide walls is made possible by means of throughplatings (vias) which are known per se and are used for contacting a plurality of conductor layers of a circuit board. These typically comprise a bore, the inner wall of which is then metallized, as already mentioned above. In particular continuous throughplatings, but alternatively or additionally, even so-called blind throughplatings are provided, i.e. blind holes, of which the inner walls are metallized, introduced into said circuit board.

In a suitable embodiment, said recesses are in particular metallized through holes in respect of said substrate layer. By this is meant that said recesses are designed to be continuous from said upper face of said substrate layer to said lower face thereof. As a result, in particular a continuous metallization is made possible, whereby said upper and said lower wave guide surface are connected in particular in electrically conductive manner.

Advantageously, said wave guide is additionally a high pass with a barrier effect vis-à-vis signals transmitted by means of said wave guide, having in particular a lower frequency than a useful frequency, whereby these low-frequency signals are suppressed. By useful frequency is in particular meant here a frequency of said useful signal. For example, said useful frequency is in the region of several tens of gigahertz and said low-frequency signals are in the region of a few tens of gigahertz. Furthermore, by barrier effect is meant that signals of a first frequency, here in particular frequencies which are lower than said useful frequency, experience greater losses during transmission than signals of a second frequency, here in particular said useful frequency. Advantageously, said barrier effect can be adjusted by suitable design of said wave guide walls. As a result of this, said barrier effect can in particular be adapted to each useful frequency. In the case of wave guide walls which are designed by throughplatings arranged at regular intervals, said barrier effect can for example be adjusted by a suitable choice of said interval.

Most preferably, said substrate layer is produced from an HF substrate which is designed to transmit HF signals, and said wave guide has an interior which is filled with said HF substrate. As a result of this, in particular said transmission of said useful signal by said wave guide is improved.

In an advantageous embodiment, said circuit board has a ground plane and said lower wave guide surface is a part of this ground plane. By multiple uses of a wave guide surface provided as a ground plane, in particular on said lower face of said substrate layer, an additional process step for producing said lower wave guide surface of said wave guide is dispensed with, whereby, overall, production is simplified.

In a further advantageous embodiment, said ground plane is at least as large as said shielding region, thus in respect of said substrate layer is arranged opposite a surface contained by said strip conductor and covering same. In combination with said shielding housing and an electrically conductive connection of ground plane, strip conductor and shielding housing, as a result of this in particular the shielding of signals, in particular interfering signals of the electronics arranged in said shielding region is improved.

Appropriately, that part of said strip conductor which is not simultaneously the upper wave guide surface of a wave guide, is also connected, in electrically conductive manner, to said ground plane by a conductive material introduced into said substrate layer, preferably in the form of throughplatings. As a result of this, an emission of interfering signals by said substrate layer and out of said shielding region is reduced or prevented, and thereby in particular said shielding is improved. In contrast, said interior of said wave guide is preferably free from throughplatings and said upper and said lower wave guide surface are designed along said wave guide, correspondingly in continuous manner. In particular an improved transmission of said useful signal by means of said wave guide is guaranteed as a result.

Advantageously, in one of the aforementioned embodiments, a radar system is a part of a vehicle. As a result, in particular a disruption of further vehicle systems by HF signals emitted by electronics arranged in said shielding region is reduced or entirely prevented. Additionally, in particular a transmission of signals is suppressed at a lower frequency than that of said useful signal in said shielding region. Furthermore, it is possible in particular to comply with an EMC standard to be applied to systems built into vehicles.

The advantages achieved by the invention consist in particular of a circuit board for a radar system having a shielding region with HF components arranged in same, such that a useful signal is guided out of said shielding region via a wave guide provided for same and any of these emissions of signals is suppressed, i.e. said shielding region is substantially completely shielded. In particular, a disruption of antennae arranged outside said shielding region and in particular belonging to said radar system, by a signal emitted from an HF component arranged within said shielding region, thus not transmitted via said wave guide, is suppressed. Furthermore, said wave guide is a so-called substrate integrated wave guide (SIW). Furthermore, a penetration of signals into said shielding region from outside is also suppressed. Additionally, said wave guide is a high pass, and a penetration of low-frequency signals, for example mobile frequencies, in said shielding region via said wave guide is likewise suppressed. Furthermore, said circuit board has merely one substrate layer produced from an HF substrate, whereby production outlay and cost is reduced.

A further advantage is that said shielding region is covered by a shielding housing, wherein this is completely connected, in electrically conductive manner, to a strip conductor surrounding said shielding region. No further openings for passage of lines is necessary, whereby production outlay is further reduced. Additionally, said shielding housing is produced as a deep drawn part.

A further advantage is that said wave guide has in particular two wave guide walls which are developed in said substrate layer by means of throughplatings. Furthermore, said throughplatings are through holes which are metallized on the inner walls thereof, whereby said wave guide walls can be produced simply. Furthermore, said through holes are arranged at regular intervals along said wave guide. Additionally, said wave guide has an upper and a lower wave guide surface, which delimit said wave guide in combination with said wave guide walls. It is advantageous that said wave guide surfaces are connected by means of said throughplatings in electrically conductive manner and have a uniform electrical potential. Additionally, said lower wave guide surface is a part of a ground plane, whereby said wave guide is delimited by a ground potential. Furthermore, said upper wave guide surface is a part of a strip conductor surrounding said shielding region. Thereby, said wave guide surfaces of said wave guide are formed simply by wave guide surfaces present on said circuit board in any case, whereby said production outlay is reduced.

BRIEF DESCRIPTION OF THE DRAWINGS

Exemplary embodiments of the invention are explained in more detail below with the help of drawings, in which.

DETAILED DESCRIPTION OF EXAMPLE EMBODIMENTS OF THE INVENTION

Figure 1:
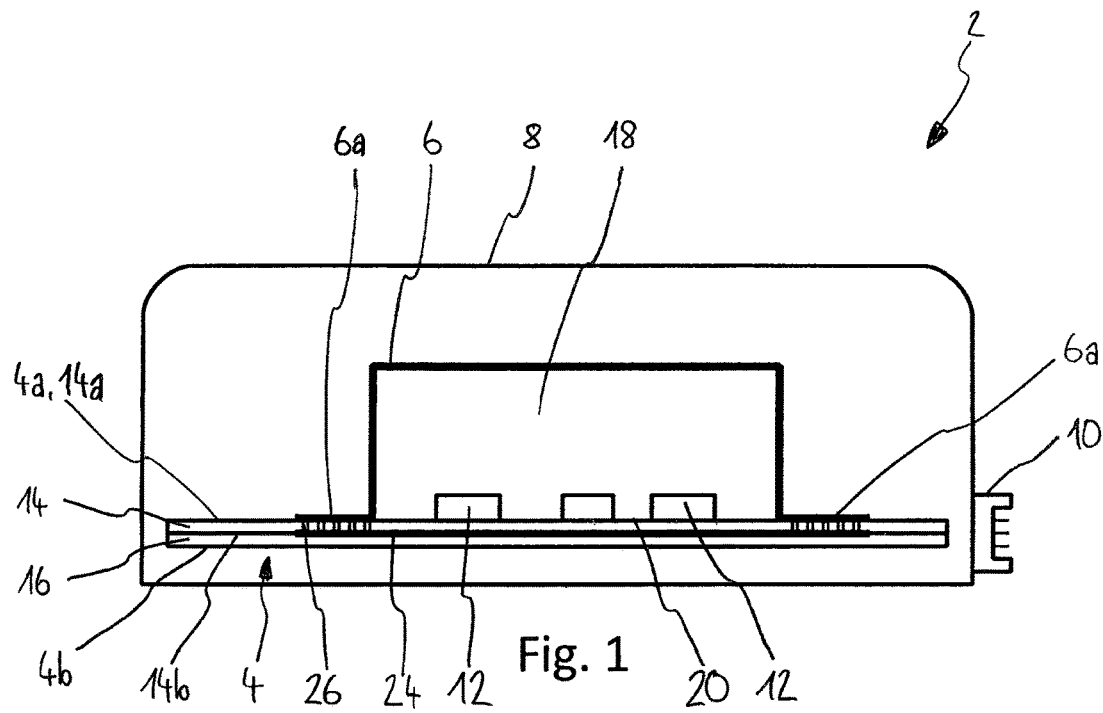
FIG. 1 shows a schematic representation of a radar system having a circuit board and a shielding housing.

Parts corresponding to one another are given the same reference numerals in all figures.

FIG. 1 shows a schematic representation of a radar system 2 having a circuit board 4 and a shielding housing 6. Radar system 2 comprises a housing 8 which also has a connection 10 via which said radar system 2 is for example connected to further systems for the purposes of exchange of data. Circuit board 4 comprises a circuit board upper face 4a, on which a number of HF components 12 are arranged, as well as a circuit board lower face 4b. Circuit board 4 is typically a multilayer system and comprises a plurality of substrate layers 14, 16. In FIG. 1 only two substrate layers 14, 16 are shown. Said circuit board upper face 4a corresponds to said upper face 14a of said first (also upper) substrate layer 14, on which said HF components 12 are arranged. Said lower face 14b faces said second (also lower) substrate layer 16 and is thus inside said circuit board 4. Said upper substrate layer 14 is produced from an HF substrate, said lower substrate layer 16 is produced from a conventional substrate which is more cost-effective in comparison. Additional electronic components, not shown here, are arranged on said circuit board lower face 4b. Furthermore, said shielding housing 6 is arranged on said circuit board upper face 4a such that said HF components 12 are housed in a space 18 defined by said shielding housing 6 and said circuit board upper face 4a. Furthermore, a shielding region 20 on said circuit board 4 is defined by this. This is surrounded by a conductive track or trace also called a strip conductor 22, not shown here (see FIG. 2), on said circuit board upper face 4a. Furthermore, said shielding housing 6 has a rim or border strip 6a which substantially follows said strip conductor 22 and is connected to same in an electrically conductive manner. Said border strip 6a is formed here by a fold of the housing 6 and is applied onto said circuit board upper face 4a. Said border strip 6a and said strip conductor 22 can be either of the same or different width. In an embodiment not shown here, said border strip 6a is an edge resting on said circuit board upper face 4a and surrounding said shielding region 20. Furthermore, a ground plane 24 opposite said shielding region 20 and covering same is arranged on said lower face 14b of said upper substrate layer 14. Said ground plane 24 and said strip conductor 22 are connected in electrically conductive manner by means of a number of throughplatings 26. Here, these are designed as cylindrical through holes, so-called vias, which have been metallized on the inside and are introduced into said upper substrate layer 14.

Figure 2:
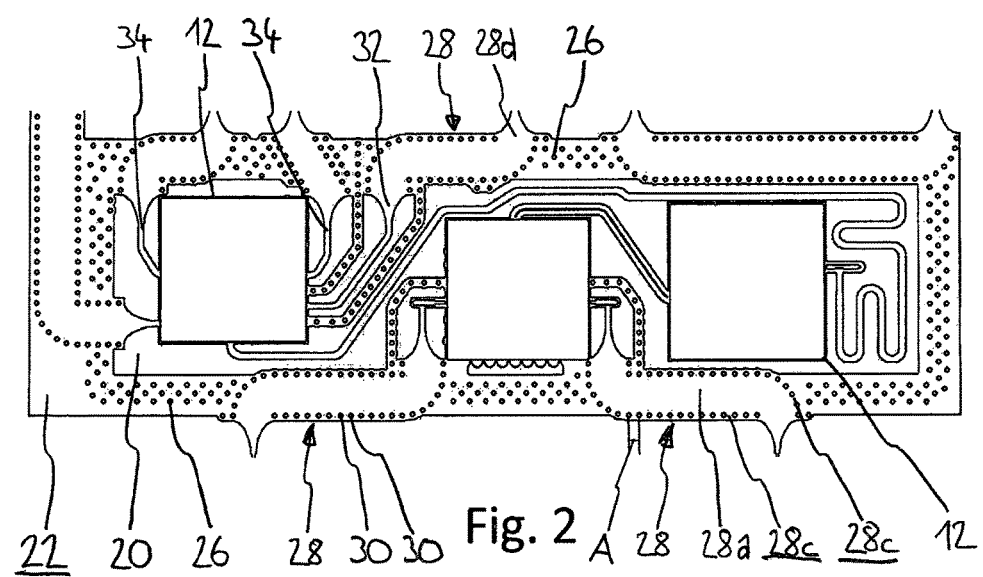
FIG. 2 shows a top view of a part of a circuit layout on said circuit board according to FIG. 1.
Figure 3:
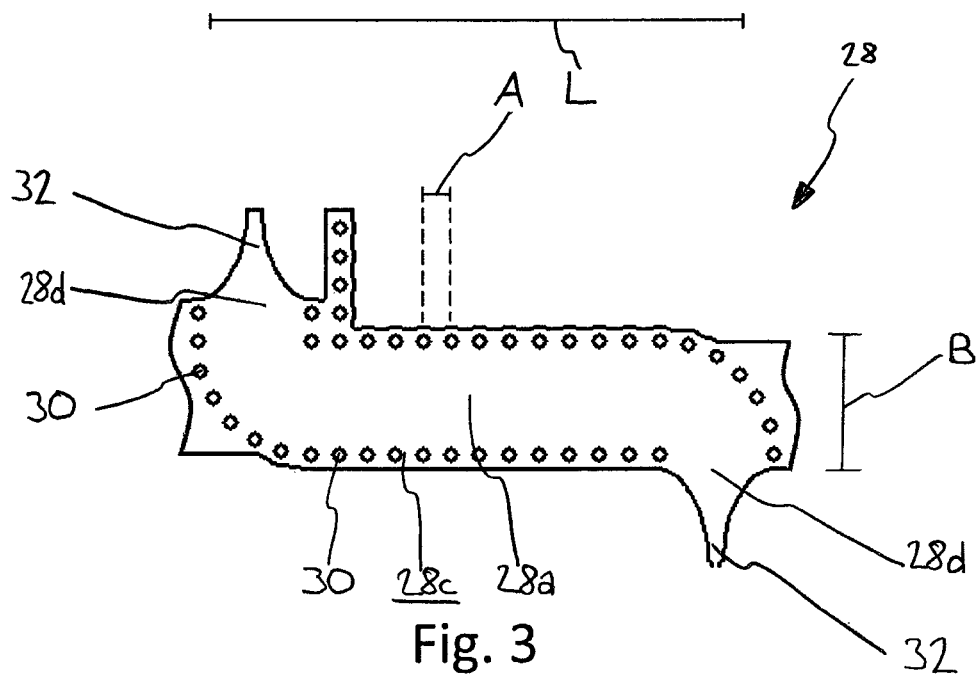
FIG. 3 shows a section cut of said circuit layout according to FIG. 2 having a wave guide.

FIGS. 2 and 3 show a part of a circuit layout of said circuit board 4 according to FIG. 1 in a top view. Said strip conductor 22 can be seen clearly here in the form of a solder trace or track, which strip conductor 22 completely surrounds said shielding region 20 in which said HF components 12 are arranged. Said strip conductor 22 is connected to said ground plane 24 in an electrically conductive manner by throughplatings 26 which are introduced largely completely circular in said upper substrate layer 14 (hereinafter simply called substrate layer), as can be seen in particular also in FIG. 1.

A plurality of wave guides 28 (here SIWs—substrate integrated wave guides) are arranged in said substrate layer 14 in such a way that each of these has an upper wave guide conductor surface 28a, which is a part of said strip conductor 22, and a lower wave guide conductor surface, which is a part of said ground plane 24. Those parts of said strip conductor 22 which at the same time are said upper wave guide surface 28a of said wave guide 28 are free from throughplatings 26 as a result. Each wave guide 28 additionally comprises two wave guide walls 28c which are formed by recesses 30. In the exemplary embodiment shown here, said recesses 30 are throughplatings 26 introduced into said substrate layer 14 along lateral sides of said wave guide 28 at regular intervals A. Also, said throughplatings 26 connect each upper wave guide surface 28a, i.e. also said strip conductor 22, to each lower wave guide surface, i.e. also to said ground plane 24, in an electrically conductive manner. In combination with both wave guide surfaces, said wave guide walls 28c define an interior which here in particular is free from throughplatings 26. This is illustrated particularly in FIG. 3, which shows a wave guide 28 having a width B and a length L which extends substantially along said strip conductor 22 and is S-shaped. Furthermore, said length L of said wave guide 28, shown in FIG. 3, is greater than width B thereof. Furthermore, FIG. 1 shows that, in each case, one end 28d of every wave guide 28 is arranged inside, and one outside, of said shielding region 20. Furthermore, a number of ends 28d is provided here with a transition region 32 from said wave guide 28 to a respective microstrip 34 on said upper face 14a. Said microstrips, not shown here, which are outside said shielding region 20, are for example connected to antennae, likewise not shown here, or to other components. Inside said shielding region 20, microstrips 34 connect said inner transition regions 32 to said HF components 12 (see FIG. 2). Additionally, to shield some of said microstrips 34 from one another, further conductor strips are provided with throughplatings 26 in said shielding region 20.

Figure 4:
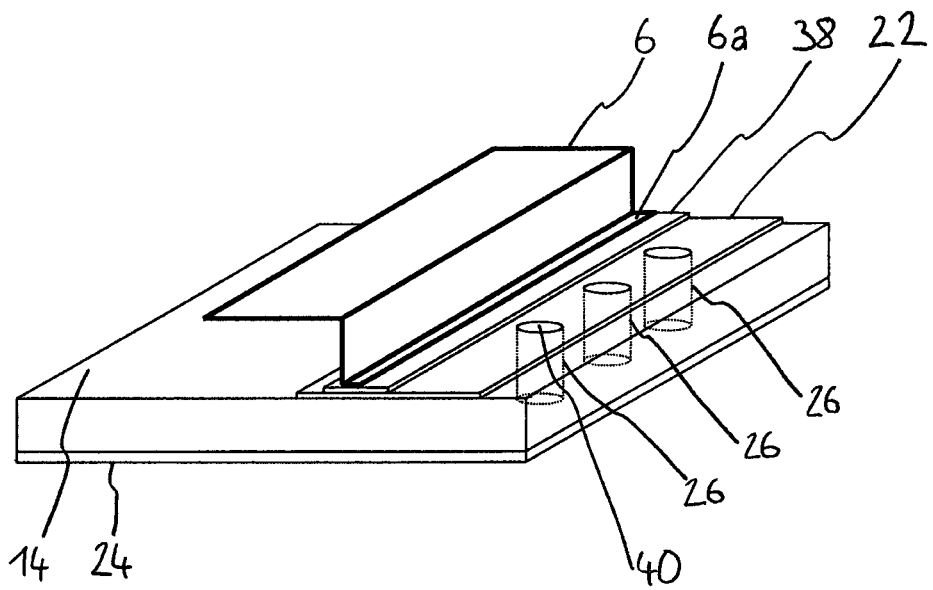
FIG. 4 shows in sectional representation, the uppermost substrate layer of said circuit board according to FIG. 1 with a shielding housing represented in sections.

FIG. 4 shows, in sectional representation, said uppermost substrate layer 14 of said circuit board 4 according to FIG. 1, a part of said strip conductor 22, and a section of said shielding housing 6, attached thereto by means of a conductive adhesive 38 or alternatively also by means of a solder. Said substrate layer 14 is made from an HF substrate in which said throughplatings 26 are introduced which are provided, on the inner walls thereof, with a conductive material 40. In this way, said throughplatings 26 produce an electrically conductive connection of said strip conductor 22 to said ground plane 24 attached to said lower face 14b of said substrate layer 14.

LIST OF REFERENCE NUMERALS 2 radar system
4 circuit board
4a circuit board upper face
4b circuit board lower face
6 shielding housing
6a border strip (of said shielding housing)
8 housing (radar system)
10 connection
HF component
14 first (also upper) substrate layer
14a upper face
14b lower face
16 second (also lower) substrate layer
18 space
20 shielding region
22 strip conductor
24 ground plane
26 throughplating
28 wave guide
28a upper wave guide surface
28c wave guide wall
28d end (of said wave guide)
30 recesses
32 transition region
34 microstrip
38 adhesive
40 conductive material
A interval
B width (of said wave guide)
L length (of said wave guide)

The invention claimed is:

1. A vehicle radar system for detecting surroundings of the vehicle, which radar system comprises:
   a circuit board including a substrate layer that has an upper face and a lower face,
   a strip conductor that is disposed on said upper face and that surrounds a shielding region,
   a shielding housing that covers said shielding region and that extends along and is connected to said strip conductor in an electrically conductive manner, and
   at least one waveguide arranged in said substrate layer, wherein said waveguide has and is delimited by a lateral waveguide wall as well as an upper waveguide surface and a lower waveguide surface, wherein said upper waveguide surface is defined by a section of said strip conductor.

2. The vehicle radar system according to claim 1, wherein said waveguide has a length and a width, and said length is greater than said width.

3. The vehicle radar system according to claim 1, wherein said lateral waveguide wall is formed of a conductive material.

4. The vehicle radar system according to claim 3, wherein said conductive material connects said upper waveguide surface and said lower waveguide surface in an electrically conductive manner by a throughplating.

5. The vehicle radar system according to claim 1, wherein said lateral waveguide wall is formed by a plurality of recesses in said substrate layer.

6. The vehicle radar system according to claim 5, wherein said recesses are arranged spaced apart along said waveguide at an average interval of at least 0.5 mm and at most 4 mm.

7. The vehicle radar system according to claim 5, wherein said recesses are through holes penetrating through said substrate layer.

8. The vehicle radar system according to claim 5, wherein said recesses forming said lateral waveguide wall comprise a groove extending along a lateral side of said waveguide.

9. The vehicle radar system according to claim 1, wherein said waveguide is configured as a high pass with a barrier effect for signals of a frequency lower than a useful frequency.

10. The vehicle radar system according to claim 1, wherein said substrate layer is made of a HF substrate material that is configured to transmit HF signals, and wherein said waveguide has an interior that is filled with said HF substrate material.

11. The vehicle radar system according to claim 1, wherein said circuit board further has a ground plane, and said lower waveguide surface is defined by at least part of said ground plane.

12. The vehicle radar system according to claim 11, wherein said ground plane is at least as large as said shielding region.

13. The vehicle radar system according to claim 12, wherein said lateral waveguide wall is formed by a conductive material that extends through a thickness of said substrate layer and electrically conductively connects said upper waveguide surface defined by said section of said strip conductor with said lower waveguide surface defined by said part of said ground plane.

14. The vehicle radar system according to claim 1, which is a part of a vehicle.

15. The vehicle radar system according to claim 1, wherein said circuit board includes only one single said substrate layer, and said waveguide is confined within said one single substrate layer.

16. The vehicle radar system according to claim 1, wherein said circuit board has a multi-layer substrate including said substrate layer as an uppermost layer among plural layers of said multi-layer substrate, and wherein said waveguide is confined within said uppermost layer.

17. The vehicle radar system according to claim 16, wherein said plural layers of said multilayer substrate further include a lower layer below said uppermost layer, wherein said uppermost layer is made of an HF substrate material that transmits HF signals, and wherein said lower layer is made of a non-HF substrate material that does not transmit HF signals.

18. The vehicle radar system according to claim 1, wherein said waveguide has an S-shape along a plane of said substrate layer, with a waveguide inlet and a waveguide outlet respectively at opposite ends of said S-shape facing in opposite parallel offset directions.

19. The vehicle radar system according to claim 1, wherein said upper waveguide surface, said strip conductor and said shielding housing are all electrically connected and all at a same electrical potential.

\* \* \* \* \*